United States Patent [19]
Burger

[11] Patent Number: 6,001,400
[45] Date of Patent: *Dec. 14, 1999

[54] PROCESS FOR PRODUCING COMBINATION CREAM CHEESE AND BAGEL DOUGH PRODUCT

[76] Inventor: Alvin Burger, 9990 SW. 77thAve., Penthouse 8, Miami, Fla. 33156

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/823,803

[22] Filed: Mar. 24, 1997

Related U.S. Application Data

[63] Continuation-in-part of application No. 08/689,294, Aug. 6, 1996, abandoned, and a continuation-in-part of application No. 08/602,486, Feb. 20, 1996, Pat. No. 5,795,603, and a continuation-in-part of application No. 08/577,965, Dec. 26, 1995, Pat. No. 5,654,021, and a continuation-in-part of application No. 08/577,963, Dec. 26, 1995, Pat. No. 5,641,527, and a continuation-in-part of application No. 08/106,763, Aug. 16, 1993, Pat. No. 5,514,395, and a continuation-in-part of application No. 07/816,010, Dec. 31, 1991, Pat. No. 5,236,724.

[51] Int. Cl.⁶ .................................................... A21D 13/00
[52] U.S. Cl. ................................. 426/94; 426/19; 426/62; 426/143; 426/499; 426/516; 426/549
[58] Field of Search .................................. 426/94, 19, 21, 426/2, 99, 459, 516, 275, 143, 62, 549, 502, 89, 282, 283, 284

[56] References Cited

U.S. PATENT DOCUMENTS

| | | | |
|---|---|---|---|
| 5,514,395 | 5/1996 | Burger | 426/94 |
| 5,641,527 | 6/1997 | Burger | 426/94 |
| 5,654,021 | 8/1997 | Burger | 426/94 |
| 5,807,599 | 9/1998 | Weisberger et al. | 426/512 |

*Primary Examiner*—Lien Tran
*Attorney, Agent, or Firm*—Pendorf & Cutliff

[57] ABSTRACT

A food product which in one embodiment comprises a ring or cylinder of bagel dough or pizza dough wrapped around an exposed cream cheese center, and a process for producing the product wherein cream cheese wrapped in dough is sliced into bite-size pieces to form a raw composite product, followed by proofing and/or retarding, steaming, optionally freezing, and baking. The bite-sized product provides enjoyment of the distinctive golden-brown crust and chewey bagel dough crumb and also the fresh cream cheese taste, with no inconvenience of having to cut a bagel or separately store and spread cream cheese. The product is simple and economical to produce and convenient to consume.

19 Claims, 4 Drawing Sheets

PROCESS FOR PRODUCING COMBINATION CREAM CHEESE AND BAGEL DOUGH PRODUCT

REFERENCE TO RELATED APPLICATIONS

This Application is a continuation-in-part of U.S. application Ser. No. 08/689,294 entitled "Process for Producing Combination Cream Cheese and Bagel Dough Product, and Product Produced Thereby" filed Aug. 6, 1996 now abandoned, a continuation-in-part of U.S. application Ser. No. 08/602,486 entitled "Filled, Rolled Bagel Dough Product" filed Feb. 20, 1996 now U.S. Pat. No. 5,795,603, and a continuation in part of U.S. application Ser. No. 08/577,965 filed Dec. 26, 1995 now U.S. Pat. No. 5,654,021 entitled "Filled, Steamed Bagel Product and Method" and a CIP of U.S. patent application Ser. No. 08/577,963 entitled "Filled, Boiled Bagel Product and Method," filed Dec. 26, 1995, now U.S. Pat. No. 5,641,527 and a continuation-in-part of application Ser. No. 08/106,763 filed Aug. 16, 1993, entitled "Filled Bagel Dough Product and Method," which issued May 7, 1996 as U.S. Pat. No. 5,514,395, and a continuation-in-part of application Ser. No. 07/816,010 filed Dec. 31, 1991, entitled "Filled Bagel Dough Product and Method," which issued Aug. 17, 1993 as U.S. Pat. No. 5,236,724.

BACKGROUND OF THE INVENTION

1. Field of the Invention

The present invention relates to a process for producing a baked product featuring exposed cream cheese, and to the product produced by the process. When served bite-sized, the product fills a special niche in the fast food or convenient food industry—the product is nutritious, natural, convenient, and can compete with theater snacks such as popcorn or nachos.

2. Discussion of the Related Art

A bagel, as it has been known for hundreds of years, is a toroidally shaped dough product. The dough is worked on a flour board and set in a warm place to rise, then kneaded again before being formed into rings. The rings are formed from balls of raised dough, either by poking a hole through the center of each ball or by rolling each ball into a long strip, shaping the strip into a ring, and then pressing the ends together.

An important step in the traditional bagel making process is boiling the yeast dough in water in order to close the pores of the dough to form a skin. Boiling is followed by baking in a hot oven to turn the crust golden brown. A hard outer crust and soft chewy inner crumb portion combine to provide a distinctive "bagel" taste and feel.

A favorite way of enjoying bagels is to slice them in half, and spread a topping, such as cream cheese, on the cut surfaces. Bagels are characteristically cut open by slicing them across their width on a plane perpendicular to the axis of the toroid, and a topping such as cream cheese is then spread on the slices. Because of the hard crust, the cutting process requires a sharp knife, which can be hazardous. Further, due to the soft crumb interior, a slightly dull knife will crush the hard crust into the soft crumb interior, compacting the interior, which detracts from appearance and taste. Moreover, such planar cut is typically awkward and does not result in two planar halves.

Spreading the cream cheese on the bagel may also be tedious as the cream cheese is stored in a refrigerator and is very viscous until it warms. Because of the complex final food preparation steps, traditional bagels cannot be considered convenience or snack foods for consumption, e.g., in automobiles, while hiking, or in movie theaters.

It is known to include certain flavorings or fillers on or in bagel dough, such as unions, poppy seeds, salt, or raisins. These are materials which have substantially the same handling characteristics as bagel dough: they can withstand the heat of cooking, and are relatively stable in atmosphere at room temperature for extended periods of time. These materials are either mixed into bagel dough or coated onto bagels prior to baking. Cream cheese, in contrast, ages rapidly when exposed to air at room temperature, and is thus not a component of a conventional bagel.

Although bagels and cream cheese go together during consumption, bagels and cream cheese are very different chemically, and have different storage and handling requirements. Cream cheese is perishable, thermally sensitive, and easily contaminated, and is thus conventionally maintained in a chilled state until immediately prior to use. Pure cream cheese cannot be frozen and thawed without separation out of liquids and solids, nor can it be left exposed to air at room temperature for extended periods, nor can it be boiled in water or be subject to the high temperatures at which bagel dough is cooked. Thus, for reasons of product preparation as well as for reasons of food storage and handling, it would be counterintuitive to incorporate cream cheese into bagel dough prior to cooking.

U.S. Pat. No. 5,236,724 entitled "Filled Bagel Dough Product and Method" which issued to the present inventor was first to describe a technique by which cream cheese could actually be incorporated into a bagel dough shell. The invention was made under the assumption that cream cheese had to be protected from the high temperatures of baking, and thus had to be completely enclosed (hermetically sealed) within a bagel dough shell. The product was made by a relatively simple process wherein cream cheese was first completely encapsulated in a raw dough shell, the dough was allowed to rise, and the dough shell was boiled or steamed for a period of time sufficient to set the dough, though it was sometimes difficult to prevent the cream cheese filler from denaturing, boiling or becoming altered in texture or taste. The product was then baked to brown the crust. However, due to (1) the difficulty in shaping the product and (2) the difficulty in completely setting the dough without spoilage of the cream cheese, the product was limited to a bagel ball shape. While these bagel balls were new and unique, they were small in size and could not carry toppings.

The inventor continued his explorations and later discovered that by chilling or freezing the product prior to steaming or boiling, the cream cheese filler would be protected for a longer period of time as the product heated up from the outside in. The product could thus be formed into more diverse shapes which could be steamed or boiled for a time sufficient to set the dough, including forming a skin not only on the outer surface of the dough but also on the internal skin of the dough contacting the cream cheese. The underlying assumptions in all these processes were that (1) the dough shell must be of even thickness so that the dough is evenly exposed to heat and evenly sets, so that there are no regions of either raw or overcooked dough, and (2) the cream cheese must be protected from the steam or boiling water used in setting the dough, and is protected by the combination of chilling the cream cheese core and by the thermal insulative properties of the dough shell.

However, a problem remains with respect to displaying the merchandise. A product which contains a cream cheese filling has the same outward appearance as a conventional bagel article. The vendor must either cut open an example bagel for display purposes, which leads to waste, particularly if one of each type of bagel is to be displayed, or provide some form of visual advertisement attempting to draw attention to the product.

It would thus be advantageous to have a bagel product wherein the cream cheese filling is exposed in the final product. The conventional handling instructions on cream cheese packages, however, instruct that cream cheese is to be kept refrigerated and not frozen. Considering the sensitivity of cream cheese to the heat and steam which are essential to the cooking of the dough, it is difficult to envision a process by which an exposed cream cheese product could be produced. In fact, until the present invention, great care had been taken in the production of cream cheese filled dough products to ensure that the cream cheese was completely enclosed in dough, in order to avoid problems of leakage or denaturing of the cream cheese. Further, considering the inability to freeze most or all types of cream cheese, it is an object of the invention to produce a combination cream cheese and dough product which can be frozen for shipment or storage, and in which the cream cheese, once thawed, has the feel and taste of fresh cream cheese.

There is a need for a product which is attractive in appearance, easily and economically produced, and conveniently consumed as a snack item.

There is also a need for a bite-sized product which can be economically shaped, steamed, optionally partially browned, and frozen on a large scale, and shipped to retailers for final browning and serving.

SUMMARY OF THE INVENTION

It is an object of the present invention to produce a bagel dough, pizza dough, or bread dough product in which cream cheese component is exposed, which provides enjoyment of the distinctive bagel and cream cheese taste, with no requirement for cutting or spreading the cheese. It is a further object of the invention to provide a combination cream cheese and dough product which can be stored for long periods of time in a freezer.

It is yet a further object of the invention to provide a bagel, pizza or bread dough product with exposed cream cheese by a simplified process, such that the product can be mass produced.

It is yet a further object of the invention to provide a bagel product which is easy to handle and can be readily warmed and served in such environments as movie theaters, shopping malls, catered banquets, breakfast buffets, coffee shops, and fast food establishments.

The process comprises selecting a high-fat heat-stable cream cheese, forming a composite product comprising the high-fat heat-stable cream cheese and a dough such as a bagel dough, pizza or bread dough, steaming the composite to set the dough, optionally freezing, and then baking to form a convenient combination cream cheese and baked dough food product with exposed cream cheese.

The product is preferably bite-sized. The exposed cream cheese serves to advertise the contents of the dough and to show that the product is a novel combination of baked dough and cream cheese, optionally flavored cream cheese or cream cheese with additives marbled in or coextruded in.

The product provides enjoyment of the distinctive golden-brown crust and chewy bagel dough crumb and also the fresh cream cheese taste, with no inconvenience of having to cut a bagel or separately store and spread cream cheese. The product is simple and economical to produce and convenient to consume, particularly when served bite-sized.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other filled dough products for carrying out the same purposes of the present invention. It should also be realized by those skilled in the art that such equivalent products and processes do not depart from the spirit and scope of the invention as set forth in the appended claims.

DETAILED DESCRIPTION OF THE INVENTION

Figure 1:
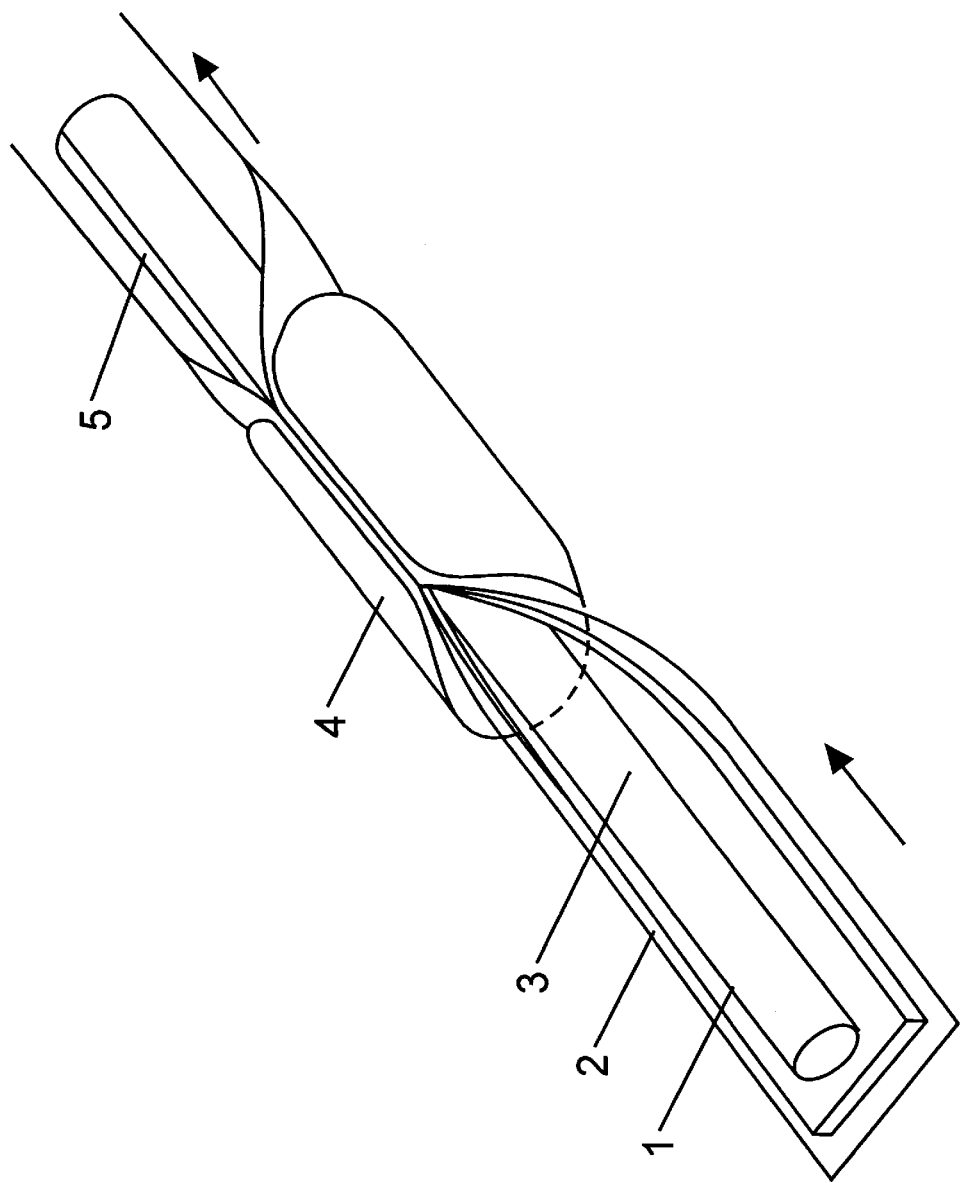
FIG. 1 shows forming a continuous cream cheese filled dough tube by wrapping a continuous sheet of dough around a continuous strand of cream cheese.

The present invention represents a significant advance over the technology disclosed in U.S. application Ser. Nos. 08/602,486, 08/577,965 (allowed), 08/577,963 (allowed) and U.S. Pat. Nos. 5,514,395 and 5,236,724, each of which are incorporated herein by reference. After further experimentation, a process was surprisingly discovered which eliminated the requirement to completely encase the cream cheese in dough. The resulting product is easy to form, inexpensive to produce, and is produced without any loss of texture or flavor of the product.

Steaming the raw formed product not only cooks the dough, but also chemically modifies the cream cheese to allow it to be frozen for storage, together with the bagel, pizza or bread dough wrapper. Surprisingly, even though the cream cheese is partially exposed to the steam during cooking according to the present invention, the cream cheese is not damaged, and if the product is frozen for storage, the texture of the cream cheese, upon reheating, is substantially the same as if it had never been frozen.

In one specific embodiment of the invention, the present inventor discovered that a combination cream cheese and bagel dough or pizza dough product can be quickly and economically produced by a method comprising:

(a) forming a shape comprising a ring of bagel, pizza or bread dough circumscribing a quantity of a high fat, heat stable cream cheese, the cream cheese not being completely sealed by the dough;

(b) proofing the product;

(c) optionally cooling the proofed product to below 50°, more preferably below 40°, or even freezing the dough of the proofed product;

(d) steaming the proofed product to set the dough (1–12 minutes);

(e) optionally freezing the steamed product for long term storage or shipping; and (f) baking sufficiently to form a crust, preferably a golden brown crust.

Obviously, the shape comprising the bagel, pizza or bread dough circumscribing a quantity of cream cheese may be bite sized in step (a), e.g., may be a shape such that if forms a product about 1.5 inches in diameter and 0.75 inches in thickness after proofing, or it may be in the form of a long roll which can be sliced into sections at any time prior to or after steaming.

One exemplary automated process involves:

(a) forming a continuous strip of dough, preferably bagel dough, preferably 2.5–4.0 inches in width and 0.25 to 0.5 inches in thickness;

(b) depositing a high fat, heat stable cream cheese, preferably a continuous strand of cream cheese, on top of said continuous strip of dough;

(c) rolling said continuous strip of dough around said cream cheese to form a continuous cream cheese filled dough tube product;

(d) separating into segments, proofing, and optionally cooling the proofed product to below 50°, more preferably below 40°, most preferably freezing the proofed product;

(e) steaming the product of step (d);

(f) preferably cooling to ambient temperature or less and (g) baking the product of step (e–f).

A further automated process involves extrusion, such as by:

(a) forming inner and outer longitudinally-extending extrusion conduits;

(b) extruding a high fat, heat stable cream cheese, optionally cream cheese mixed with a further filler such as blueberry preserves, cherry preserves, chocolate, onion, etc., through the inner of said extrusion conduits and extruding a dough, preferably a bagel dough, through the outer of said extrusion conduits to form a continuous extrudate comprising a cream cheese filled dough shell;

(d) separating the extrudate into segments, proofing the extrudate, and cooling the extrudate, in any order;

(e) steaming the product of step (d);

(f) optionally cooling the product of step (e); and (g) baking the product of step (f).

That is, it was found that a high fat, heat stable cream cheese, which was preferably but not necessarily cooled or frozen, can be steamed, preferably within a short period of time from cooling, for a brief period of time without concern that the partially exposed cream cheese would be spoiled by steaming. That is, a high fat, heat stable cream cheese is not significantly denatured by the exposure to steam for the temperature and time needed to set the dough. In fact, the cream cheese tends to form a skin which improves handling characteristics in subsequent steps such as the baking step.

As discussed above, it is preferred not to separately form each individual bite-sized product. Rather, it is preferred to form a continuous, cylinder-like filled shape by a suitable technique such as co-extrusion or wrapping a sheet of dough around a continuously extruded strand of cream cheese, with the cream cheese forming the core and the bagel, pizza or bread dough forming a shell. The continuous extruded cylinder can then be sliced or cut into individual bite-size units or "bits". About 12 bagel bits can be formed from the material required to form one bagel.

The sliced product is proofed to form a proofed product having a diameter of about one to one and one half inch and a thickness of about one-half inch.

The product is preferably cooled or frozen (the term "cooling" including freezing) prior to steaming, but this thermal reduction is not necessary when using a high fat, heat stable cream cheese. Steaming then forms an external and an internal skin, sets the yeast, and forms a wet crust.

Surprisingly, the product of the invention can be freezer stored, where traditional solid cream cheese could not be freezer stored because fresh uncooked cream cheese curdles. Steaming a frozen cream cheese centered wrapped bagel dough product, before or after the yeast upon the outside crust of the raised dough has been set, acts chemically to modify the cream cheese to allow it to be frozen for long periods of time, together with the bagel, pizza or bread dough shell, so that the texture of the cream cheese, upon reheating, is substantially the same as if it had never been frozen.

The food product is preferably served immediately after browning, and may be displayed or stored at room temperature in open bins in the same manner in which bagels are currently displayed, or be bagged for later consumption. Accordingly, if the food product is to be stored, it is preferably stored by freezing immediately after steaming. The frozen product may then be put directly into an oven to brown the crust, and when removed from the oven, the cream cheese may be cool while the dough has the texture and taste of a traditional bagel.

The term "cream cheese", as used herein, is intended to refer to any high fat, heat stable cream cheese which can be wrapped with, marbled with, or otherwise compounded with a bagel, pizza or bread dough. For ease of description the term "cream cheese" is sometimes used in the specification.

The term "cream cheese" is not intended to include high water content cream cheeses such as the cream cheese product disclosed in U.S. Pat. No. 5,470,593 which discloses a fat free cream cheese product having a water content of between 70 and 77%.

The term "cream cheese" is also not intended to include cream cheese altered by or mixed with other ingredients which are used in the industry to produce high sugar, heat stable cheese based toppings for pastries or for cheese cake. Examples of such mixtures include those described in U.S. Pat. No. 4,732,772 teaching a cheesecake mix comprising cream, sugar, milk, nonfat dry milk, sodium caseinate salt, modified starch, locust bean gum, mono and diglycerides, xanthan gum, sodium tripoly phosphate and potassium sorbate, or U.S. Pat. No. 4,795,650 teaching a cheesecake product made from sour cream, cream, corn syrup, sugar, cinnamon, lemon juice, egg yolk, cream cheese, and stabilizer.

In contrast to the cheesecake mixes or pastry toppings discussed above, the cream cheese used in the present invention is a substantially pure, high fat, heat stable (i.e., low water content) cream cheese. For example, Philadelphia Free Cream Cheese having 30 calories per 1 oz serving, of which 0 calories is from fat, is not a high fat heat stable cream cheese. Philadelphia Light Cream Cheese having 70 calories per 1 oz serving, of which 64 calories is from fat, is also not a high fat heat stable cream cheese. Philadelphia Cream Cheese having 100 calories per 1 oz serving, of which 90 calories is from fat, is a high fat heat stable cream cheese.

The cream cheese according to the present invention may be in admixture with other ingredients which do not materially alter the above characteristics of the cream cheese. For example, the cream cheese may be intimately mixed with heat stable ingredients such as pepper, dried onion, sausage, or dried fish. It may be displaced by jellies or jams or chocolate, i.e., these ingredients may be marbled into the cream cheese without diluting or materially altering the cream cheese component, such that the cream cheese component is a discrete component recognizable as having the above characteristics.

The characteristics of the preferred cream cheese are as follows:
- at least 75 fat calories per ounce, preferably 80 fat calories per ounce, most preferably 90 fat calories per ounce;
- water content less than 15% prior to cooking, preferably less than 10% prior to cooking, most preferably less than 5% prior to cooking;
- heat stable—a one ounce cube will not deform or denature when exposed to 550 degree Fahrenheit dry heat or 212 degree Fahrenheit steam for 2 minutes, reaching a core temperature of at least 140 degrees, preferably heat stable at core temperatures below 170 degrees, most preferably heat stable to core temperatures of 200 degrees.

Preparing bagel dough

Although the present invention includes, e.g., pizza dough, and is not limited to bagel dough, bagel dough is preferred and the invention will be illustrated below with examples using bagel dough. The term "bagel dough" as used herein refers to a very turgid, high protein dough, such as known to make bagels using conventional bagel-making techniques. Such dough is similar to a lean French bread dough, being firm to the touch and easily rolled upon a floured surface. The dough is comprised of a mixture of flour, water, yeast, salt, and sugar. The flour should be a high gluten flour, such as a good clear spring wheat flour with protein content of typically 13.5–14% of flour weight. Water should be added in a quantity of typically 45–48% of flour weight. Salt content should typically be 1.5–2.2% of flour weight. Yeast should be added in a quantity of typically 0.5–2% of flour weight. Sugar, which serves as a food for the yeast and not as a contributor to the final product, should be a dextrose, corn syrup, malt, high fructose or other fermentable sugar, and can be added up to 4% of flour weight. Residual sugar contributes to the browning of the crust during baking.

Shaping process #1—forming strips and wrapping

The unproofed dough may be shaped before proofing, or may be retarded overnight or up to 56 hours. A retarder may optionally be used in the retarding process, a retarder differing from a conventional refrigerator in that the circulating air is at a low velocity and humidity is controlled.

Next, the bagel dough, preferably relaxed bagel dough, is formed into a continuous flat sheet of dough approximately 2–4 inches wide, preferably 3¾ inches wide. The sheet of dough may be formed by hand, and the entire filling and process may be performed by hand, but for manufacturing on a large scale it is preferred to manufacture by an automated procedure using conventionally available equipment or slightly modified conventionally available equipment.

Mechanically, the continuous sheets 1 are produced either by extrusion of dough through a nozzle having the width and thickness of the desired continuous sheet, or by rolling dough repeatedly until the desired continuous sheet is produced.

The sheets are conveyed along a conveyor belt 2 in the longitudinal direction, i.e., lengthwise. A depositor (not shown) as conventionally available in the bakery art, preferably a fluted drum type depositor which does not impart high shear forces to the cream cheese, is used to deposit a strand of approximately ¼–⅜ inch diameter cream cheese 3 such as PHILADELPHIA BRAND(™) preferably at room temperature or below, most preferably at about 40–60° F., onto the dough sheet 1. Precise placement of cream cheese on the sheet is not critical, but it is preferred that the strand be deposited centrally. Up until this point, the product manufacturing equipment is equipment which is conventionally available in the bakery art.

The flexible continuous conveyor belt may be, e.g., high release plastic, or coated heavy canvas. The belt may be dusted with a solid release agent or moistened with white divider oil or mineral oil to prevent sticking of the bagel dough to the conveyer and to facilitate release. A guide may be provided to make sure the dough sheet lays correctly on the belt.

The flexible conveyor belt 2 is drawn longitudinally through the center axis of a tube 4, referred to herein as the forming tube 4, which has an inner circumference approximately equal to the width of the belt 2. Drawing the flexible belt 2 through this tube 4 causes the outer edges of the belt 2 to curl upwards and towards each other until the edges touch and the belt forms a circular cross section. This rolling-up of the belt into a tubular shape causes the bagel dough sheet 1 to wrap around the cream cheese 3, the edges to contact and adhere, and the dough to form a cylinder 5 around the cream cheese strand, as shown in FIG. 1.

The dimensions of the belt and dough and cream cheese may be varied as desired so long as the desired rolling process is obtained, i.e., the longitudinal edges of the bagel dough come up and wrap around the cream cheese and contact each other to fuse lightly and form a continuous cylinder or tube around the cream cheese.

The rolled cylinder 5 of bagel dough with cream cheese hermetically sealed in the center axis leaves the forming tube 4. The flexible belt 2, no longer constrained by the forming tube 4, relaxes and lays flat. The rolled cylinder of bagel dough 5, which has lightly fused together at the top, remains in the form of a cylinder 5.

Figure 2:
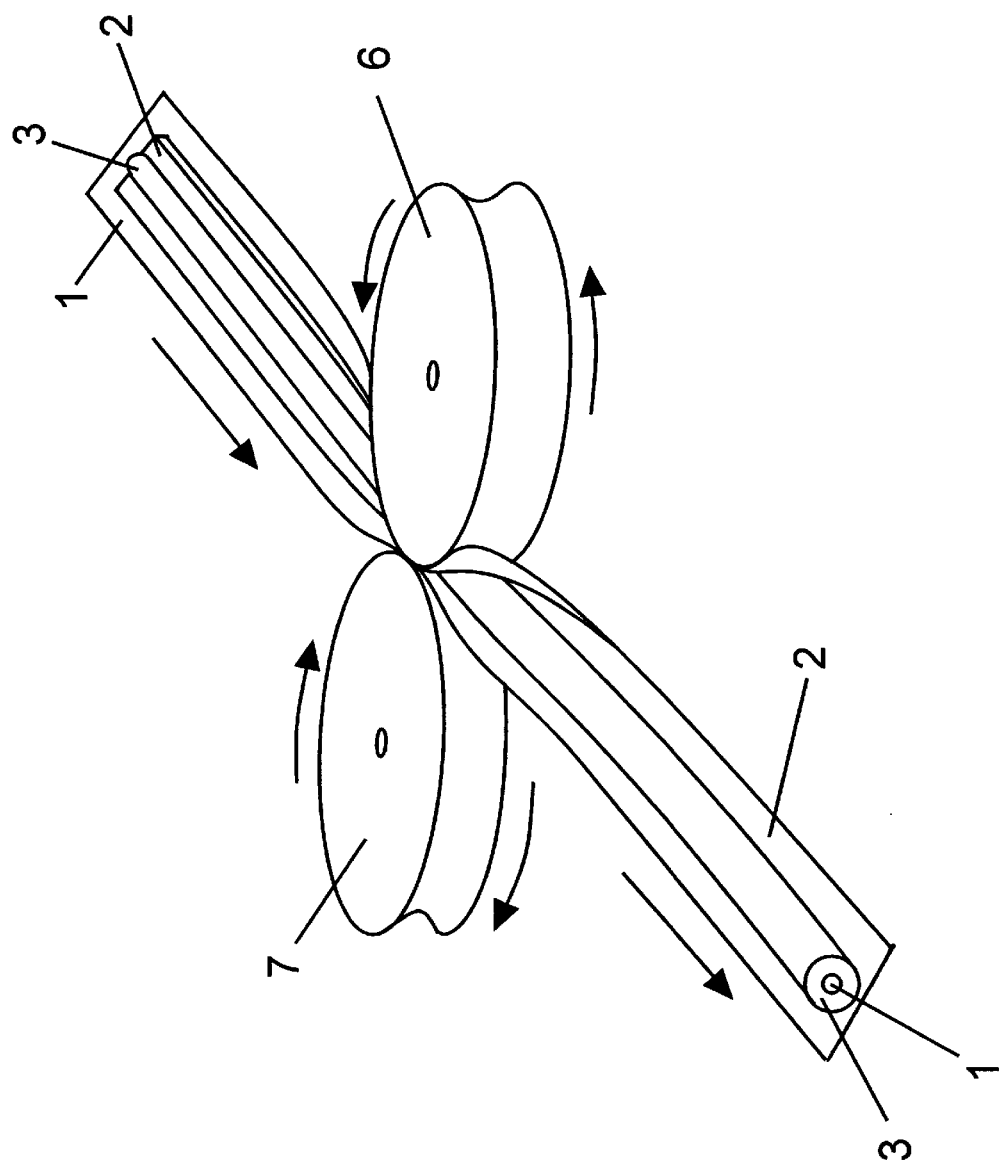
FIG. 2 shows an alternate process for forming a continuous cream cheese filled dough tube by wrapping a sheet of dough around a strand of cream cheese.
Figure 3:
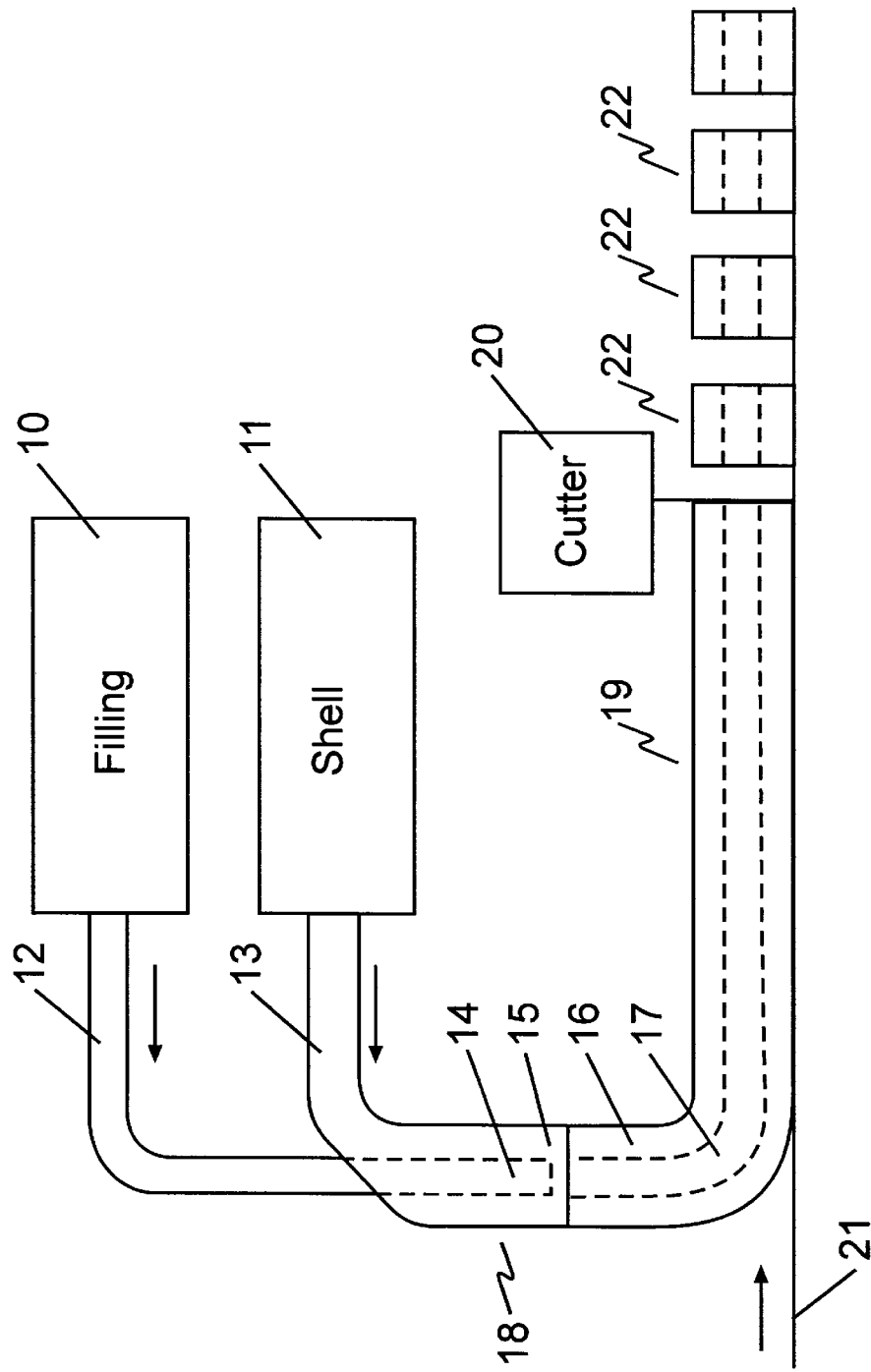
FIG. 3 shows production of filled bagel dough products by an extrusion process.

An alternative method for rolling the conveyor belt 2 is shown in FIG. 2. Instead of forming tube 4, two forming wheels 6, 7 with concave rims are used to roll the conveyor belt 2, and the thereon deposited dough sheet 1. Upon relaxation of the pressure on the conveyor belt 2, the conveyor belt 2 again lies flat, but dough 1 remains adhered and rolled into a tube about cream cheese filling 3.

This continuous cylinder which is about 1¾ inches in diameter proceeds along the conveyor 2 along its longitudinal axis to a cutter (not shown in FIGS. 1 and 2). The cutter may be a vertical cross cutter with either a blade or a wire cutter, or a motorized wire guillotine.

Shaping process #2—co-extrusion

The most conventional method for fast and economical production of a continuous filled tube involves co-extrusion. Co-extrusion technology is old and need not be discussed in detail here. Reference may be made to U.S. Pat. No. 4,794,009 disclosing a method and apparatus for forming filled dough products, U.S. Pat. No. 4,259,051 teaching extrusion of a dough tube encasing ketchup or sour cream, U.S. Pat. No. 4,882,185 to Hayashi teaching a vertical tubular extrusion of bread dough crust material and jam or cream core material, U.S. Pat. No. 4,251,201 to Krysiak illustrating an apparatus for the preparation of a filled pretzel, U.S. Pat. No. 3,917,863 disclosing an annular food ring, U.S. Pat. No. 3,615,675 disclosing an extruder that produces a dough tube filled with a suitable food material, and U.S. Pat. No. 3,541,009 teaching a device for forming a cereal shell and simultaneously filling the shell with a filler. Symmetrical and non-symmetrical extrusion products, multi-level co-extrusion products, and multi-material products are within the contemplation of the invention. Other methods of production of filled dough products are described in U.S. Pat. Nos. 4,794,009 and 4,882,185.

A large variety of cross-sectional shapes can be formed by machine or by hand, as shown for example in the brochure for Rheon Encrusting Machine Model 208, section on Cylindrical Molding. In the following, automated processes for forming such continuous tubular products will be described, although it will be readily apparent that the item could be formed by other, more labor intensive manual processes.

First, a co-extruder is used to extrude a continuous cylinder with a cream cheese core and a tubular bagel dough outer shell. Suitable co-extruders are well known in the art, and are described in, e.g., U.S. Pat. No. 4,882,185 (Simelunas et al.), and U.S. Pat. No. 4,794,009 (Dreisin), U.S. Pat. No. 4,251,201 (Krysiak). Further, commercially available co-extruders are capable of extruding such a continuous cylinder. For example, VEMAG Maschinenbau GmbH of Verden, Germany produces a coextruder, Type 892, capable of producing, e.g., ketchup-filled sausages or apple sauce filled sausages.

In greater detail, a first hopper 10 is filled with cream cheese filling. A second hopper 11 is filled with dough material. Either the hoppers 10, 11 are pressurized, or a feed means is provided in feed conduits 12, 13 for conveyancing filling and dough to co-extrusion nozzle 18 comprising internal nozzle 14 and external nozzle 15. Extruded from the nozzle is a continuous cylinder 19 with a cream cheese core 17 and a tubular bagel dough outer shell 16.

Figure 5A:
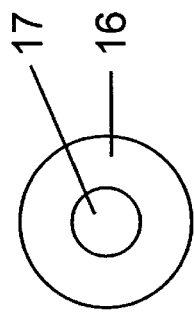
FIG. 5a is a top view of a cream cheese filled bagel dough product.
Figure 5B:
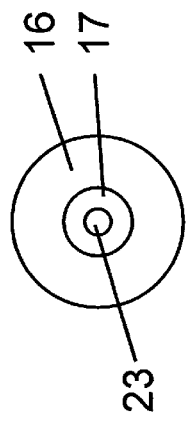
FIGS. 5b and 5c are top views of a cream cheese and fish-paste filled bagel dough products.
Figure 5C:
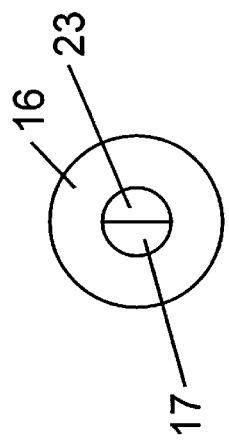
Figure 4:
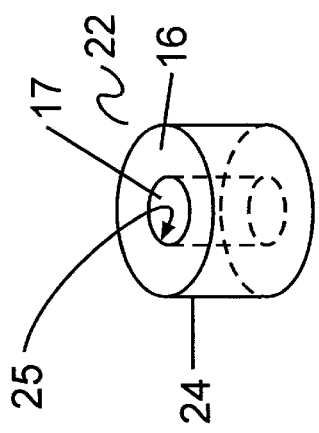
FIG. 4 is an elevated perspective view of the filled bagel dough product.

The continuous tube 19 is deposited upon conveyor belt 21 where it is conveyed to cutter 20 and cut into segments 22, preferably immediately after leaving the nozzle, of about ¼ to 1 inch in thickness. A segment 22 is shown in enlarged view in FIG. 4. Various extrusion constitutions are shown in FIG. 5a (cream cheese 17 surrounded by tube of bagel dough 16), 5b (fish paste 23 surrounded by cream cheese 17 surrounded by tube of dough 16) and 5c (fish paste 23 extruded adjacent to cream cheese 17, and both surrounded by tube of dough 16).

Once the continuous tube is sliced or divided into bite-sized pieces, the pieces are collected, for example, using a Rheon push panner, which collects and deposits 20, 36, 50, or more pieces onto a pan.

Shaping process #3—marbling

To one pound of raw unproofed bagel dough as discussed above, a ¼ pound lump of high fat, heat stable cream cheese is added, and the two components are mixed for a short time sufficient only to "marble" the dough with the cream cheese, but not so long that the cream cheese disapears into and becomes intimately mixed into the dough. The dough is cut into bite-sized pieces or may be sliced into large flats up to 8 inches in diameter with a thickness of ½ to 1 inch. The amount of mixing is limited to the extent that, once cooked, the product is not a cream cheese flavored dough product, but rather, a composite comprising discrete bagel dough and veins or swirls of cream cheese. When eating the product, the bagel dough and cream cheese components can be separately felt and tasted in the mouth.

Proofing

The bite-size product is then placed to proof within a warm cabinet or unheated oven for 25–90 minutes, preferably 30–45 minutes at approximately 80–110° F., preferably 90–100° F., which permits the yeast to raise the dough. Generally proofing time is reduced as the temperature is increased, up to the optimal condition for fermentation.

It is preferred by certain producers of traditional bagels to partially proof the product, followed by retarding. Retarding involves cooling the product to about 40° F. for about 8–12 hours. A product which is cooled to this temperature may be ready for steaming after a short final proofing.

Chilling—Optional

Subsequent to proofing, and prior to steaming, the bite-size or other sized product may be, but need not be, chilled. Chilling provides the cream cheese with a cool core temperature which helps to protect the cream cheese during steaming.

In the case of chilling, the bite size product 22 is chilled until the cream cheese 17 is at least about 40–50° F., preferably lower than 40° F., and can be frozen.

Steaming

The filled, shaped, proofed (and optionally chilled) bagel dough product may be steamed for approximately 30 seconds to 12 minutes, preferably about 1–5 minutes, most preferably 1–2 minutes, in a cooking step to provide a wet crust.

During steaming the cream cheese has a higher ability to withstand heat, a slower rate of heat absorption, and is partially blanketed by dough, and thus remains cooler than the dough. During steaming dough may rise to a temperature of 140–170 degrees Fahrenheit, while the cream cheese in the dough only rises to a temperature of 70–155 degrees Fahrenheit. The temperature of the dough and cream cheese is one component of the cooking process, and is not particularly restricted so long as the temperature of the cream cheese does not exceed 212 degrees Fahrenheit, preferably 200 degrees Fahrenheit.

The bite-sized product 22 is placed in a steamer preferably for about 1½ minutes to enable the hot steam to set the yeast of the crust sufficiently to skin the outside crust 24. The cream cheese 17 contributes to this step as it provides steam within the bagel shell which causes the inner surface of the bagel product 22 to form a skin 25.

The step of steaming the cheese-filled dough acts chemically to modify the cream cheese and enable the cheese to be frozen, together with the bagel shell, so that the texture of the cheese, upon reheating, is the same as if it had never been frozen. Thus, not only does the process of the invention provide a novel bakery product that provides both bagel and cream cheese in a conveniently packaged, prepared combination, but it enables lengthening of the cream cheese shelf-life over what would normally be available for separately sold bagels and cream cheese.

Chilling—Freezing

After steaming, and prior to placing in an oven, the product may be chilled or even frozen. Chilling the product after the outside had been set by steaming helps to cool the cream cheese enough to prevent denaturalization of the cream during browning, while effectively pasteurizing the cream cheese and giving the cream cheese freezable characteristics as discussed above.

In the case that chilling is carried out, the steamed bite size product 22 is chilled until the cream cheese 17 is at least about 40–50° F., preferably lower than 40° F., and most preferably the product is frozen. Chilling prevents the cream cheese 17 from becoming denatured by the heat of the baking process, thus, preserving texture and taste.

If the product is intended to be stored or shipped, it is preferred that the product is frozen after steaming or after partial or full browning. The frozen product is ready for baking, and need not be thawed prior to baking.

Egg wash

The product 22 may be glazed with egg wash prior to the baking step and may be filled, topped, or coated with other assorted seasonings and spices, such as sesame seeds, poppy seeds, salt, pepper, Cajun spices, liquid smoke impregnated, marinated vegetable bits, dried onion, dry cheese, spicy corn meal, etc., to enhance the flavor and to accommodate the tastes and specific desires of individual consumers, or may be wet with water or egg white and water then rolled in seeds, etc., to completely coat the exterior of the finished product.

Of course, any of these materials may be mixed with the cream cheese or dough prior to cooking, preferably prior to proofing to allow dough to grow around and seat seeds, etc.

Toppings

A "topping" is an item which is more substantial than the particles which are applied with egg wash or water. At any time subsequent to proofing, toppings such as slices of ham, fish, seeds, garlic, salt, cheese, tomatoes, spinach, etc. may be applied to the dough product. Topping prior to proofing results in the topping being more firmly adhered to the bagel product, which facilitates handling, transporting, packaging, and consumption.

Impinger Conveyor Oven

The steamed and then chilled (including frozen) product may next be placed in an oven for approximately 1–10 minutes, preferably about 2 minutes, of browning (depending upon temperature, type oven (e.g., convection, residential, etc.), and size of filled product). Obviously, the smaller or thinner the product, the faster the baking or browning time.

The product may be browned by applied heat in an impinger conveyor oven (similar to a commercial pizza oven) for approximately 2 minutes.

The yeast is most likely fully deactivated prior to the browning step, but any remaining active yeast may continue to ferment within the crumb 16 for a short period to reduce the size of gas cells in the annular interior of the baked product 22. The finished dough texture becomes compacted, since the crusts have already been set during the steaming step.

It is yet a further surprising discovery that a filled bagel product prepared in accordance with the present invention may be baked for an extended period of time to produce a product with a low moisture content, providing a non-traditional bagel dough product which can be stored for long periods without freezing or refrigeration. This dried product is an ideal snack food. A crisp product can be packaged like potato chips and lasts a long time, with a shelf life of 12 months or longer.

Blast Freezer

The product 22 may be frozen at any time after proofing and steaming. The product may be stored in a freezer for up to one year without deterioration, or up to one month in a refrigerator without deterioration.

The inventive process produces freezable cream cheese 17 which ordinarily would curdle if frozen, or from which liquids would separate from solids during thawing. The steaming step acts chemically to enable the cream cheese 17 to be frozen, together with the bagel shell. Further, upon reheating within the bagel shell, the cream cheese 17 is restored to its original texture and flavor. Thus, the product 22 not only provides a freezable, cream cheese 17 filled bagel product which, upon reheating, is extremely tasty and provides the same enjoyment as conventional heated bagels which are cut open and filled with cream cheese, the product 22 also allows the lengthening of the shelf-life of the cream cheese 22 through allowing it to be frozen. The one year period of storage far exceeds the storage capability of separately sold conventional bagels and cream cheese.

Packaging

Any conventional packaging process may be used.

Consumption

The product is a cream cheese-filled bagel dough product which can be defrosted or heated to provide enjoyment of the distinctive bagel and cream cheese taste, with no requirement for cutting or spreading the cheese. The process of the invention enables the steamed product to be frozen, including the cream cheese, for extended periods with no deterioration in quality.

If a proofed, steamed, but preferably unbaked or only partially baked product is sold to retailers or consumers in a frozen state, it may be thawed, micro-waved or, preferably, placed in an oven while still frozen and baked or browned by the consumer prior to consumption. The thawed or frozen product is preferably placed in a hot oven for approximately 1–10, preferably about 5 minutes, of browning (the time varying according to the mass of the individual products). During browning the steam given off by the cream cheese filling further steams and forms a skin on the inside of the shell. The resulting product is an absolutely perfect, fresh, cream cheese-filled bagel dough product which provides enjoyment of the distinctive bagel and cream cheese taste, with no requirement for cutting or spreading the cheese.

If a proofed, steamed and baked product is sold to retailers or consumers, the product may be thawed, microwaved, or baked. In the case that the product is browned or partially baked prior to freezing and selling to the consumer, the filling in the filled bagel product gives off steam during the baking process, which forms a skin in the inside wall of the bagel dough shell. This skin allows for cold storage of the composite, and for secondary baking by the consumer to further form a crust on the outside of the shell. Baking quickly results in a warm bagel exterior and a cool cream cheese interior, which is highly desirable.

In an alternative embodiment of the invention, the product may be proofed and frozen prior to steaming, and may be steamed subsequent to prolonged storage.

Further, the product may even be grilled in much the same way that a grilled cheese sandwich is prepared, and can be sold directly to the consumer in much the same way that slices of pizza are currently being sold.

In yet a further embodiment, the composites may be baked to the point that the bagel shell and cream cheese are dehydrated, forming a dry product which may be stored without requiring freezing. This dried product has a crunchy mouth-feel and can compete with potato chips, nachos, etc., but is more natural than these fatty foods.

Thus, not only does the process provide a novel bakery product that provides both bagel and cream cheese in a conveniently packaged, prepared combination, but it enables lengthening of the cream cheese shelf-life over what would normally be available for separately sold bagels and cream cheese.

Variations

Another option is to take the filled bagel product after the chilling step, and before the baking step, and frying and then dipping the product in sugar or sugar glaze sprayed or brushed on to make a confectionery type of bagel.

The filled dough product, in addition to being filled with cream cheese, may also be filled with other traditional bagel topping, such as onions, poppy seeds, fruit preserves, or lox. The surface may be shined or glazed, if desired, with an egg or other wash.

Now that the invention has been described,

I claim:

1. A process for forming a composite cream cheese and dough product, said process comprising:
    (a) selecting a high-fat, heat-stable cream cheese;
    (b) preparing a raw dough selected from the group consisting of bagel dough, pizza dough, and bread dough;
    (c) forming a composite by at least partially surrounding a strand of high-fat, heat-stable cream cheese with said raw dough, wherein in said composite an area of said cream cheese is exposed corresponding at least to the cross-sectional area of said strand of cream cheese;
    (d) proofing the composite product of step (c);
    (e) steaming the composite product to set the dough; and
    (f) baking the product.

2. A process for forming a composite cream cheese and dough product as in claim 1, wherein said dough is pizza dough.

3. A process for forming a composite cream cheese and dough product, said process comprising:
    (a) selecting a high-fat, heat-stable cream cheese;
    (b) preparing a raw yeast bagel dough;
    (c) forming a composite by at least partially surrounding a strand of high-fat, heat-stable cream cheese with said raw dough, wherein in said composite an area of said cream cheese is exposed corresponding at least to the cross-sectional area of said strand of cream cheese;
    (d) proofing the composite product to activate said yeast to raise said dough through fermentation;
    (e) steaming the product of step (d) to set the dough;
    (f) optionally freezing the product after step (e); and
    (g) baking the product.

4. A process for forming a composite cream cheese and dough product as in claim 3, further including a step of cooling said product to a cream cheese temperature of 50° F. or below 50° F. prior to steaming in step (e).

5. A process for forming a composite cream cheese and dough product as in claim 3, wherein the product prior to steaming weighs 8 ounces or less.

6. A process for forming a composite cream cheese and dough product as in claim 3, wherein said product prior to steaming weighs 8 ounces or more, is separated after steaming, and after baking weighs 3 ounces or less.

7. A process for forming a composite cream cheese and bagel dough or pizza dough product, said process comprising:
    (a) forming a composite comprising a cylinder of bagel, pizza or bread dough circumscribing a strand of high-fat, heat-stable cream cheese, wherein in said composite an area of said cream cheese is exposed corresponding at least to the cross-sectional area of said strand of cream cheese;
    (b) proofing the product;
    (c) steaming the proofed product of step (b) to set the dough;
    (d) freezing the product; and
    (e) baking the product.

8. A continuous process for forming a composite cream cheese and bagel dough or pizza dough product, said continuous process comprising:
    (a) forming a continuous strip of dough;
    (b) depositing a continuous strand of high fat, heat stable cream cheese on top of said continuous strip of dough;
    (c) rolling said continuous strip of dough around said cream cheese to form a continuous cream cheese filled dough tube product;
    (d) separating said dough tube into segments and proofing, in any order, such that in each segment an area of cream cheese is exposed corresponding at least to the cross-sectional area of said strand of cream cheese;
    (e) steaming the product of step (d) to set said dough;
    (f) optionally freezing the product of step (e); and
    (g) baking the product.

9. A continuous process for forming a composite cream cheese and dough product as in claim 8, wherein said dough is bagel dough.

10. A continuous process forming a composite cream cheese and dough product as in claim 8, wherein said strip of dough is 2.5–4 inches in width and 0.25–0.5 inches in thickness.

11. A process for forming a composite cream cheese and dough product comprising:
    (a) forming inner and outer longitudinally-extending extrusion conduits;
    (b) extruding a high fat, heat stable cream cheese through the inner of said extrusion conduits and extruding a dough through the outer of said extrusion conduits to form a continuous extrudate comprising a cream cheese filled dough shell;
    (d) separating the extrudate into segments such that in each segment an area of cream cheese is exposed corresponding at least to the cross-sectional area of said extruded cream cheese, and proofing the extrudate, said separating and proofing occurring in any order;
    (e) steaming the product of step (d); and
    (f) baking the product of step (e).

12. A process as in claim 11, wherein said cream cheese is selected from the group consisting of natural cream cheese and artificial cream cheese.

13. A process as in claim 11, wherein said dough is comprised of flour having a weight and protein content of 13.5–14% of flour weight, a water content of 48–50%, a salt content of 1.5–2.2% of flour weight, 0.3–2.5% sugar, and a yeast content of 0.5–2% of flour weight.

14. A process for forming a composite cream cheese and dough product, said process comprising:
    (a) forming a composite comprising a ring of dough circumscribing a strand of heat stable, high fat cream cheese, such that an area of cream cheese is exposed corresponding at least to the cross-sectional area of said strand of cream cheese measured in the plane of said ring, said composite having a maximum weight of 1 ounce;
    (b) proofing the product of step (a);
    (c) steaming the product of step (b) to set the dough;
    (d) washing at least part of the surface of the product of step (c) with egg wash and coating the washed surface with a particulate material;
    (e) optionally freezing the product after step (d); and
    (f) baking the product.

15. A process for forming a composite cream cheese and dough product as in claim 14, wherein said particulate material is selected from the group consisting of poppy seeds, sesame seeds, salt, and dried onion.

16. A process for forming a composite cream cheese and dough product as in claim 14, further comprising a step of adding a topping to said shape prior to step (b).

17. A continuous process as in claim 8, wherein said high fat, heat stable cream cheese has 75–90 fat calories per ounce.

18. A process for forming a composite cream cheese and dough product, said process comprising:
- (a) selecting a high-fat, heat-stable cream cheese having at least 100 calories per 1 oz. serving, of which 75–90 calories is from fat;
- (b) preparing a raw bagel dough comprised of flour having a weight and protein content of 13.5–14% of flour weight, a water content of 48–50%, a salt content of 1.5–2.2% of flour weight, 0.3–2.5% sugar, and a yeast content of 0.5–2% of flour weight;
- (c) forming a composite by at least partially surrounding a strand of high-fat, heat-stable cream cheese with said raw dough, wherein in said composite an area of said cream cheese is exposed corresponding at least to the cross-sectional area of said strand of cream cheese;
- (d) proofing the composite product to activate said yeast to raise said dough through fermentation;
- (e) optionally cooling the product of step (d);
- (f) steaming the product of step (e) to set the dough;
- (g) optionally freezing the product after step (f); and
- (h) baking the product of step (g).

19. A process for forming a composite cream cheese and dough product as in claim 1, said process further comprising chilling the product of step (c) prior to steaming.

* * * * *